(12) United States Patent
Seymour

(10) Patent No.: US 11,053,112 B2
(45) Date of Patent: Jul. 6, 2021

(54) SYSTEMS FOR PRODUCING AND DISPENSING CHILLED WATER

(71) Applicant: Kooler Ice, Inc., Byron, GA (US)

(72) Inventor: Kerry Seymour, Elko, GA (US)

(73) Assignee: KOOLER ICE, INC., Byron, GA (US)

( * ) Notice: Subject to any disclaimer, the term of this patent is extended or adjusted under 35 U.S.C. 154(b) by 190 days.

(21) Appl. No.: 16/504,690

(22) Filed: Jul. 8, 2019

(65) Prior Publication Data

US 2021/0009400 A1 Jan. 14, 2021

(51) Int. Cl.
*B67D 1/08* (2006.01)
*F25D 31/00* (2006.01)
*C02F 1/00* (2006.01)
*B67D 1/00* (2006.01)
*C02F 1/44* (2006.01)
(Continued)

(52) U.S. Cl.
CPC .............. *B67D 1/0857* (2013.01); *A23L 2/52* (2013.01); *B67D 1/0003* (2013.01); *C02F 1/001* (2013.01); *C02F 1/441* (2013.01); *F25C 1/04* (2013.01); *F25C 5/182* (2013.01); *F25D 31/002* (2013.01); *B67D 2001/0095* (2013.01); *B67D 2210/0001* (2013.01)

(58) Field of Classification Search
CPC ................ B67D 1/0857; B67D 1/0003; B67D 2001/0095; B67D 2210/0001; B67D 3/009; A23L 2/52; C02F 1/001; C02F 1/441; F25C 5/182; F25C 2400/14; F25C 1/04; F25D 31/002
See application file for complete search history.

(56) References Cited

U.S. PATENT DOCUMENTS 2,234,425 A 3/1941 Brady
2,721,450 A * 10/1955 Entler .................. B67D 1/0857
62/306
(Continued)

OTHER PUBLICATIONS

International Search Report and Written Opinion for PCT/US2011/064963.

*Primary Examiner* — Cassey D Bauer
*Assistant Examiner* — Evan J. Cusick
(74) *Attorney, Agent, or Firm* — McClure, Qualey & Rodack, LLP

(57) ABSTRACT

A representative system includes: an exterior housing defining an interior compartment; a water tank disposed within the interior compartment; a filtration system configured to receive a flow of water from outside the exterior housing, filter the flow of water and provide filtered water to the water tank; an ice maker, disposed along a first flow path from the water tank, configured to produce ice from the filtered water provided from the first flow path; an ice bin configured to receive the ice from the ice maker; a user interface configured to receive a user input corresponding to a request for chilled water; a water control valve, disposed along a second flow path from the water tank, configured to receive the filtered water provided from the second flow path and provide a controlled flow of the filtered water to the ice bin in response to the user input such that the controlled flow of the filtered water is cooled by the ice in the ice bin to form chilled water; and a water dispenser fluidly communicating with the ice bin and configured to provide the chilled water outside of the exterior housing according to the user input.

11 Claims, 8 Drawing Sheets

(51) Int. Cl.
*F25C 5/182* (2018.01)
*F25C 1/04* (2018.01)
*A23L 2/52* (2006.01)

(56) References Cited

U.S. PATENT DOCUMENTS

| | | | |
|---|---|---|---|
| 3,151,668 A | 10/1964 | Zimmermann | |
| 3,608,786 A | 9/1971 | Shelley et al. | |
| 3,807,193 A | 4/1974 | McKenney | |
| 4,333,612 A | 6/1982 | Hayashi | |
| 4,338,794 A | 7/1982 | Haasis, Jr. | |
| 5,088,300 A | 2/1992 | Wessa | |
| 5,109,651 A | 5/1992 | Stuart | |
| 5,277,016 A | 1/1994 | Williams | |
| 5,560,211 A * | 10/1996 | Parker | B67D 1/0869 |
| | | | 62/137 |
| 5,630,310 A | 5/1997 | Chadwell | |
| 5,997,745 A * | 12/1999 | Tonelli | B01D 61/022 |
| | | | 210/180 |
| 6,093,312 A | 6/2000 | Boulter | |
| 6,112,539 A | 9/2000 | Colberg | |
| 6,266,945 B1 | 7/2001 | Schroeder | |
| 6,324,850 B1 | 12/2001 | Davis | |
| 6,561,691 B1 | 5/2003 | McCann et al. | |
| 6,904,946 B2 | 6/2005 | James | |
| 6,932,124 B2 | 8/2005 | Dalton et al. | |
| 7,207,156 B2 | 4/2007 | Metzger | |
| 7,428,824 B1 | 9/2008 | Malachowsky et al. | |
| 7,624,773 B2 | 12/2009 | Maxwell | |
| 2004/0079103 A1 | 4/2004 | Hawkes et al. | |
| 2004/0216481 A1 | 11/2004 | James et al. | |
| 2004/0231343 A1 | 11/2004 | Fukumoto et al. | |
| 2006/0005553 A1 | 1/2006 | Metzger | |
| 2006/0207271 A1 | 9/2006 | Elsom et al. | |
| 2007/0175235 A1 | 8/2007 | Metzger | |
| 2008/0276641 A1 * | 11/2008 | Wolski | B67D 1/0014 |
| | | | 62/390 |
| 2008/0283145 A1 | 11/2008 | Maxwell | |
| 2009/0120126 A1 | 5/2009 | Mew | |
| 2009/0145158 A1 | 6/2009 | Anselmino et al. | |
| 2009/0165492 A1 | 7/2009 | Wilson et al. | |
| 2009/0285956 A1 * | 11/2009 | Landers | F28D 9/0093 |
| | | | 426/477 |
| 2010/0293984 A1 | 11/2010 | Adamski et al. | |
| 2011/0061420 A1 | 3/2011 | Anderson et al. | |
| 2012/0111449 A1 | 5/2012 | Hsu | |
| 2012/0186276 A1 * | 7/2012 | Seymour | G07F 17/0071 |
| | | | 62/66 |
| 2013/0068422 A1 | 3/2013 | Horowitz | |
| 2014/0311168 A1 | 10/2014 | Berge | |
| 2015/0210569 A1 * | 7/2015 | Dgani | B01D 15/08 |
| | | | 222/148 |
| 2016/0341462 A1 * | 11/2016 | Kim | F25D 23/04 |
| 2017/0233238 A1 * | 8/2017 | Bryant | F25B 13/00 |
| | | | 62/126 |

* cited by examiner

SYSTEMS FOR PRODUCING AND DISPENSING CHILLED WATER

BACKGROUND

Bottled water typically is purified in some manner and bottled for sale in predetermined increments of volume. The bottled water then is shipped to multiple points of sale and often refrigerated prior to use. This practice of centralized manufacture followed by distribution leads to a huge disposal problem with plastic water bottles and associated packaging.

Current trends for providing water involve various attempts to reuse water bottles, such as is facilitated by water filling stations. Unfortunately, providing an adequate volume of chilled water has proven challenging as refrigeration systems of water filling stations tend to store a relatively limited volume of chilled water that, once dispensed, is difficult to replenish due to slow volumetric cooling rates.

Thus, there exists a need to address these and/or other perceived shortcomings of the prior art.

SUMMARY

Broadly stated, the present disclosure is concerned with systems and methods for producing and dispensing chilled water. In at least one embodiment, such a system comprises: an exterior housing defining an interior compartment; a water tank disposed within the interior compartment; a filtration system, disposed within the interior compartment, configured to receive a flow of water from outside the exterior housing, filter the flow of water and provide filtered water to the water tank; an ice maker, disposed within the interior compartment and along a first flow path from the water tank, configured to produce ice from the filtered water provided from the first flow path; an ice bin, disposed within the interior compartment, configured to receive the ice from the ice maker; a user interface configured to receive a user input corresponding to a request for chilled water; a water control valve, disposed within the interior compartment and along a second flow path from the water tank, configured to receive the filtered water provided from the second flow path and provide a controlled flow of the filtered water to the ice bin in response to the user input such that the controlled flow of the filtered water is cooled by the ice in the ice bin to form chilled water; and a water dispenser fluidly communicating with the ice bin and configured to provide the chilled water outside of the exterior housing according to the user input.

In some embodiments, the filtration system has a reverse osmosis (RO) filter assembly and a pre-RO filter assembly; the pre-RO filter assembly is configured to receive the flow of water, reduce particulate content from the flow of water and provide pre-RO filtered water to the RO filter assembly; the RO filter assembly has an RO pump and a first RO membrane assembly; and the RO pump is configured to receive the pre-RO filtered water and direct the pre-RO filtered water to the first RO membrane assembly, which filters the pre-RO filtered water and provides the filtered water to the water tank.

In some embodiments, the RO filter assembly has a second RO membrane assembly fluidly communicating in series with the first RO membrane assembly.

In some embodiments, the pre-RO filter assembly has a sediment filter.

In some embodiments, the pre-RO filter assembly further has a carbon filter fluidly communicating in series with the sediment filter.

In some embodiments, an ultraviolet (UV) filter, disposed along the first flow path and the second flow path, is configured to further filter the filtered water provided from the water tank.

In some embodiments, a pre-demand pump, disposed along the first flow path and the second flow path, is configured to provide a pressurized flow of the filtered water from the water tank.

In some embodiments, a flavor delivery assembly is configured to selectively provide a flavoring agent to the chilled water.

In some embodiments, the water dispenser has a first chilled water outlet configured to dispense the chilled water and a second chilled water outlet configured to receive the flavoring agent from the flavor delivery assembly and dispense the chilled water with the flavoring agent.

In at least one embodiment, such a method comprises: receiving, by a stand-alone apparatus, a flow of water; filtering, within the stand-alone apparatus, the flow of water to produce filtered water; producing, within the stand-alone apparatus, ice from a first portion of the filtered water; cooling, within the stand-alone apparatus, a second portion of the filtered water with the ice to form chilled water in response to a user input corresponding to a request for chilled water; and dispensing the chilled water from the stand-alone apparatus in accordance with the user input.

In some embodiments, the filtering comprises performing reverse osmosis on the flow of water.

In some embodiments, the filtering further comprises performing sediment filtering prior to the reverse osmosis.

In some embodiments, the method further comprises subjecting the first portion and the second portion of the filtered water to ultraviolet light filtering.

In some embodiments, the method further comprises selectively providing a flavoring agent to the chilled water.

In some embodiments, the cooling comprises directing the second portion of the filtered water to an ice bin containing the ice.

Additional objects and/or advantages may become apparent to those skilled in the art from the following detailed description, accompanying drawings and claims.

DETAILED DESCRIPTION

For ease in explanation, the following discussion describes several embodiments of systems and methods for producing and dispensing chilled water. It is to be understood that the invention is not limited in its application to the details of the particular arrangements shown since the invention is capable of other embodiments. Also, the terminology used herein is for the purpose of description and not of limitation.

As will be described in detail, various embodiments of systems and methods for producing and dispensing chilled water involve the use of a stand-alone apparatus that is configured to produce filtered water, some of which is used to form ice. A remainder of the filtered water is directed to flow over the ice to produce chilled water, which is made available for on-demand dispensing such as into a container provided by a consumer. Notably, the chilled water is produced in response to a user input corresponding to a request for chilled water. As such, a ready supply of ice is maintained for cooling water and water is directed to flow over the stored ice only after a request for chilled water is received. This is in contrast to systems that exhibit inefficiencies by attempting to maintain a quantity of chilled water on-hand for dispensing.

Figure 1:
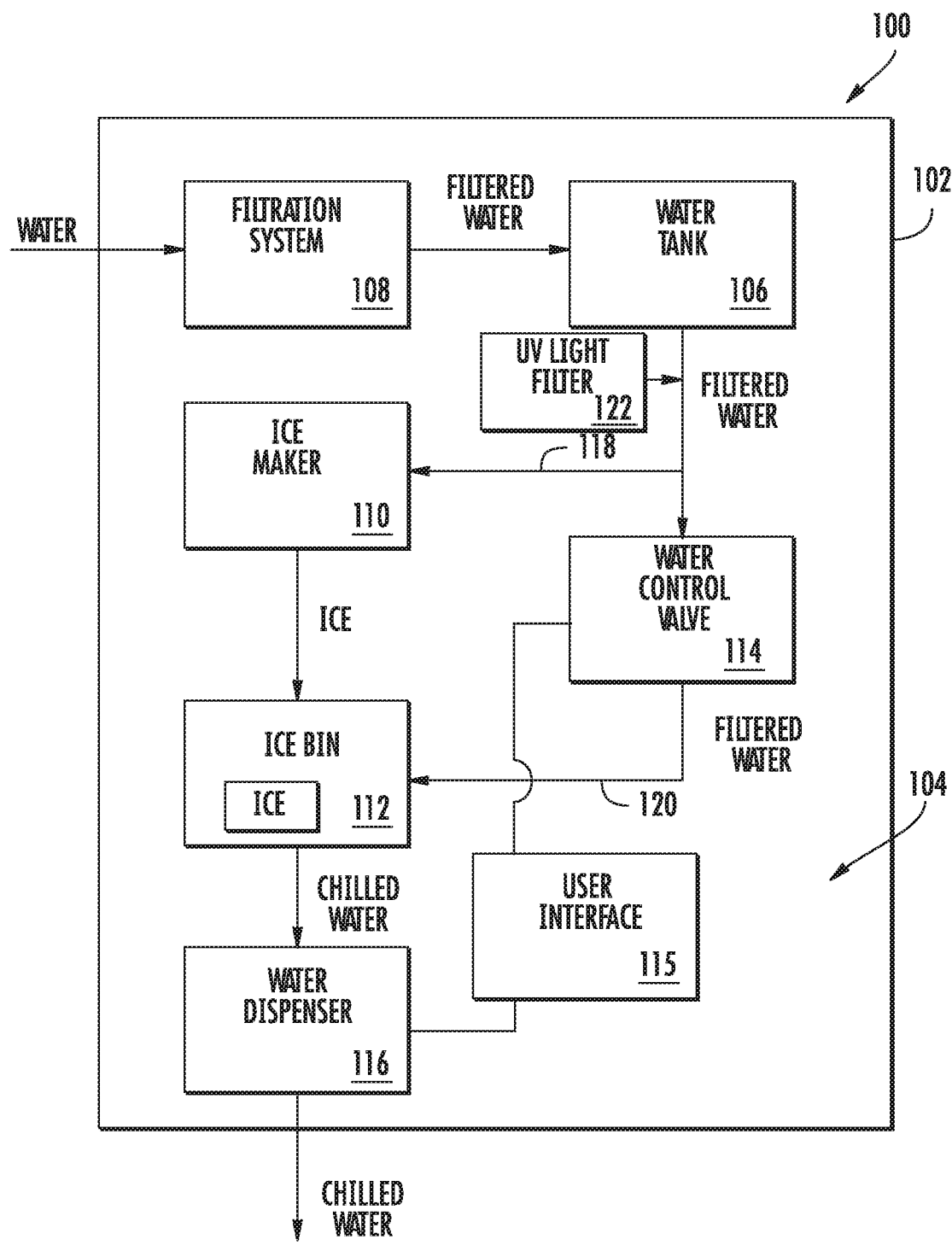
FIG. 1 is a schematic view of example embodiment of a system for producing and dispensing chilled water.

In this regard, FIG. 1 depicts an example embodiment of a system for producing and dispensing chilled water. In particular, system 100 is configured as a stand-alone apparatus that merely requires water and power hook-ups and, in some embodiments, a communications interface(s) (for example, to facilitate electronic payment, system monitoring, etc.). System 100 incorporates an exterior housing 102 that defines an interior compartment 104. Various subsystems/components are disposed within interior compartment 104, including a water tank 106, a filtration system 108, an ice maker 110, an ice bin 112, a water control valve 114, and a water dispenser 116.

Filtration system 108 is configured to receive a flow of water from outside exterior housing 102, such as from a water line. Filtration system 108 is further configured to filter the flow of water and provide filtered water to water tank 106. Downstream of water tank 106, the filtered water is routed as needed along a first flow path 118 and a second flow path 120. Specifically, filtered water routed along first flow path 118 is provided to ice maker 110 to produce ice, which is deposited into ice bin 112 for storage.

Filtered water routed along second flow path 120 is provided, via operation of water control valve 114, to ice bin 112 so that the filtered water is cooled by the stored ice to form chilled water, which exhibits a temperature slightly above the freezing temperature (32° F. or 0° C.). The chilled water is produced in response to a user input corresponding to a request for chilled water such as may be provided via interaction with a user interface 115. In some embodiments, the user input is used to direct water control valve 114 to provide an adequate amount of filtered water is directed along second flow path 120 to ice bin 112 for cooling. Additionally, the user input may be used to control dispensing of an adequate amount of chilled water from ice bin 112 by water dispenser 116 to meet the user request.

Water dispenser 116 fluidly communicates with ice bin 112 and is configured to dispense the chilled water outside of exterior housing 102. Dispensing of the chilled water may be performed in pre-programmed amounts or consumer-selected amounts according to the user input. The dispensed amounts may be set in common sizes, pints, quarts, and/or liters, for example. By way of example, if a user desired 16 ounces of chilled water, the user may interact with user interface 115 so that a user input in the form of a demand signal is provided corresponding to 16 ounces. In response to the demand signal, water control valve 114 directs an adequate amount of filtered water (e.g., 16 ounces) to ice bin 112 for cooling. As the water flows downwardly through the ice in ice bin 112, the water is cooled an a portion of the ice may melt, thus there may be more than 16 ounces of chilled water available at the bottom of ice bin 112 for dispensing. The user input then is used by water dispenser 116 to ensure that 16 ounces of chilled water is dispensed.

In the embodiment of FIG. 1, an optional UV light filter 122 is provided downstream of water tank 106 and upstream of the divergence of first and second flow paths 118 and 120. Filtered water from water tank 106 is exposed to ultraviolet (UV) light from UV light filter 122 to provide UV filtered water for the production of ice in ice maker 110 and for directing to ice bin 112 for cooling prior to being dispensed.

Figure 2:
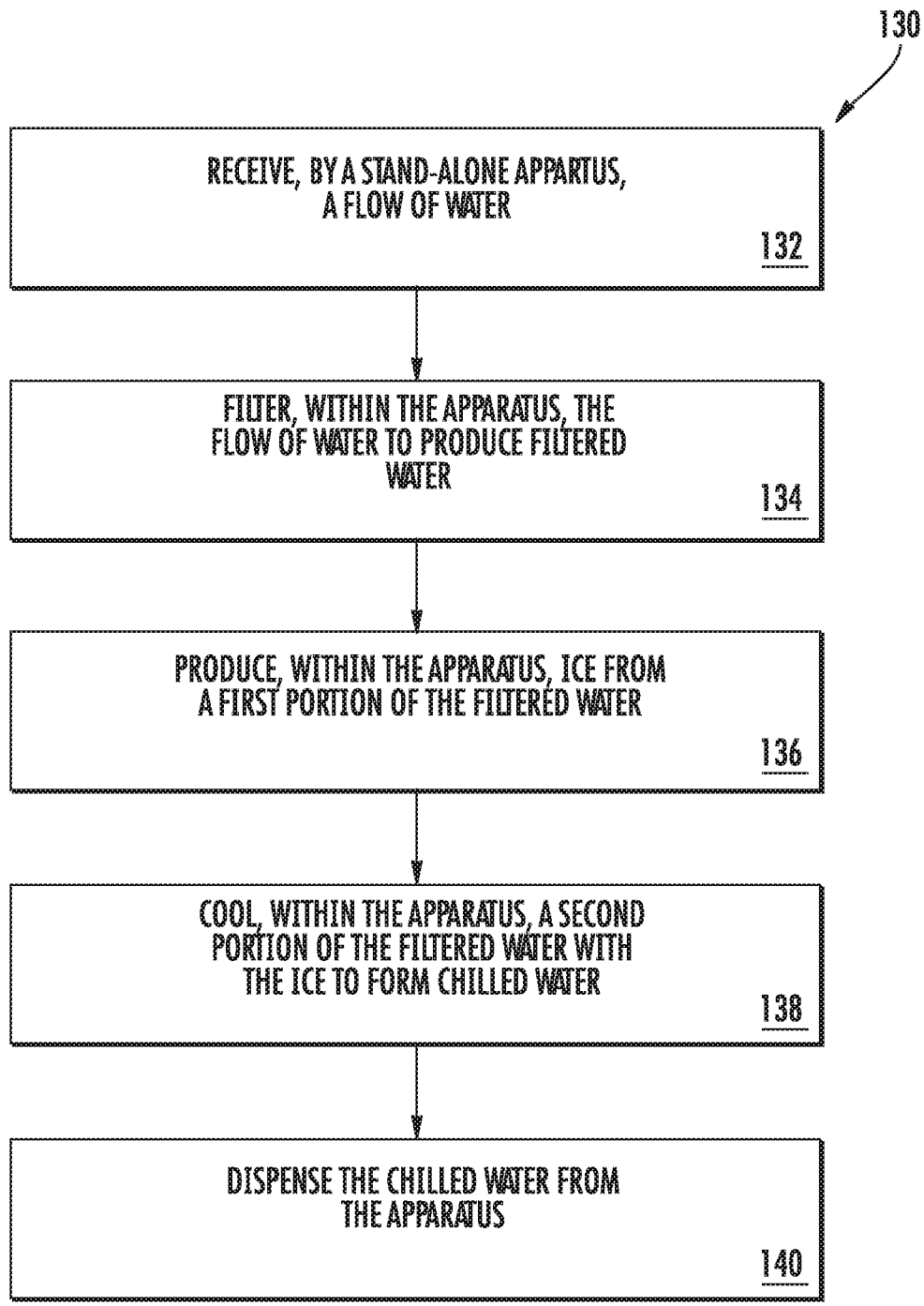
FIG. 2 is a flowchart of an example embodiment of a method for producing and dispensing chilled water.

FIG. 2 is a flowchart of an example embodiment of a method for producing and dispensing chilled water, such as may be performed by system 100, for example. As shown in FIG. 2, method 130 may be construed as beginning at block 132, in which a flow of water is received by a stand-alone apparatus. In block 134, the flow of water is filtered within the stand-alone apparatus to produce filtered water. In some embodiments, this may involve one or more of performing reverse osmosis, sediment filtering or ultraviolet light filtering on the flow of water. In block 136, ice is produced within the stand-alone apparatus from a first portion of the filtered water, and (as depicted in block 138) a second portion of the filtered water is cooled with the ice to form chilled water within the stand-alone apparatus in response to a user input corresponding to a request for chilled water. Thereafter, such as depicted in block 140, the chilled water is dispensed from the stand-alone apparatus in accordance with the user input. In some embodiments, this may additionally involve selectively providing a flavoring agent to the chilled water so that the chilled water mixes with the flavoring agent.

Figure 3B:
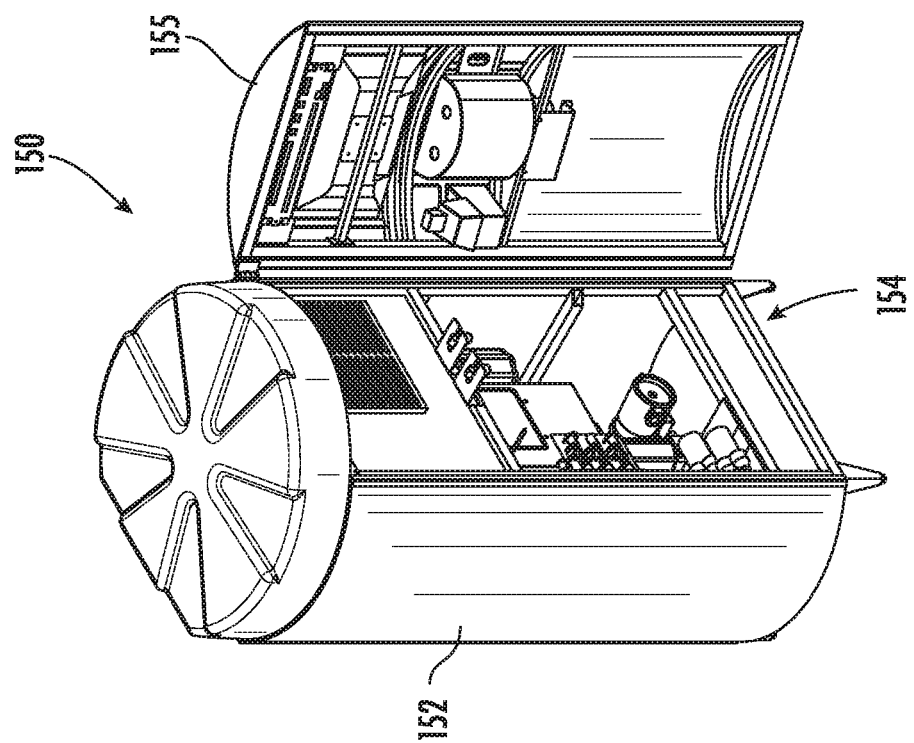
FIG. 3B is perspective view of the embodiment of FIG. 1A with the door in an open position.
Figure 3A:
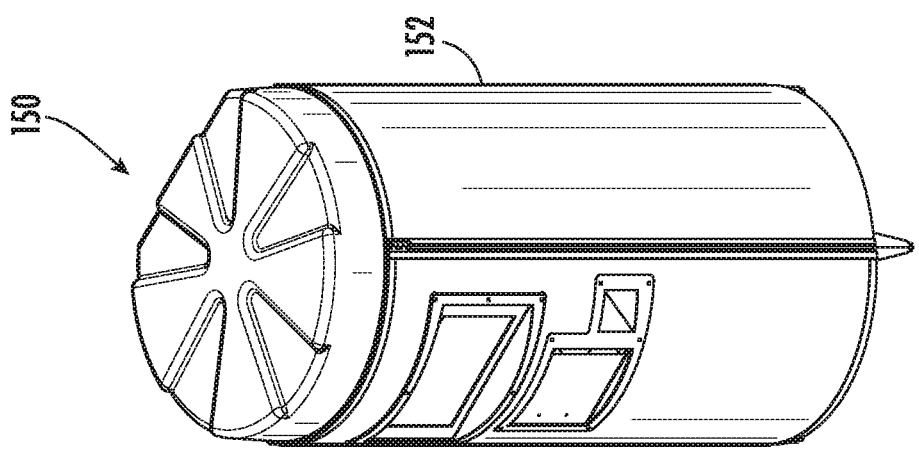
FIG. 3A is perspective view of another example embodiment of a system for producing and dispensing chilled water.

FIGS. 3A, 3B, 4A-4D and 5-12 depict another example embodiment of a system for producing and dispensing chilled water. As shown most clearly with reference to FIGS. 3A and 3B, system 150 is configured as a stand-alone apparatus that incorporates an exterior housing 152 defining an interior compartment 154. Various subsystems/components are disposed within interior compartment 154 that will be described in detail later. In this embodiment, a door 155, movable between a closed position (see, FIG. 3A) and an open position (see, FIG. 3B), provides access to interior compartment 154 when in the open position.

Figure 4D:
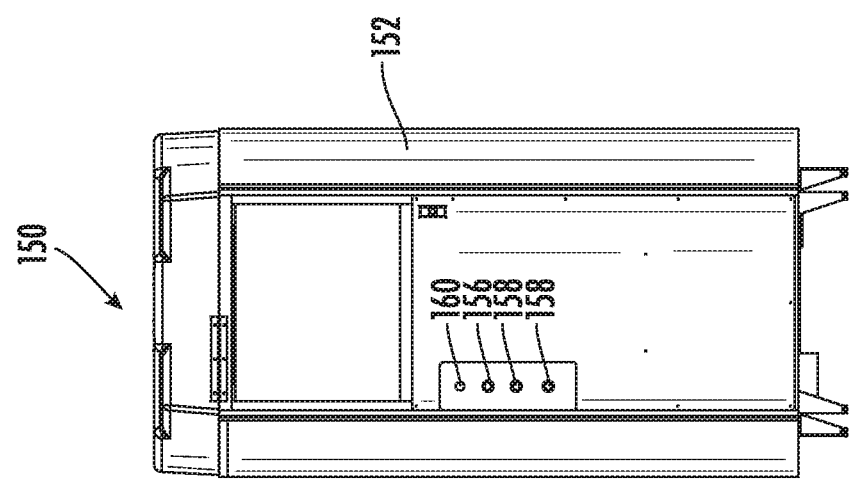
FIGS. 4A-4D are schematic elevational views of the embodiment of FIGS. 3A and 3B.
Figure 4C:
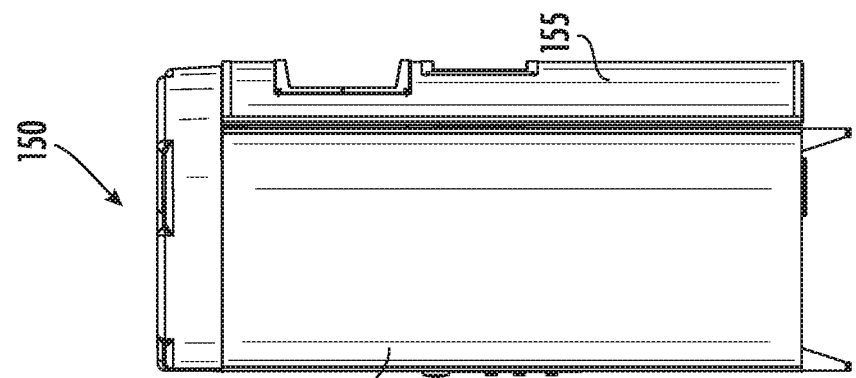
Figure 4B:
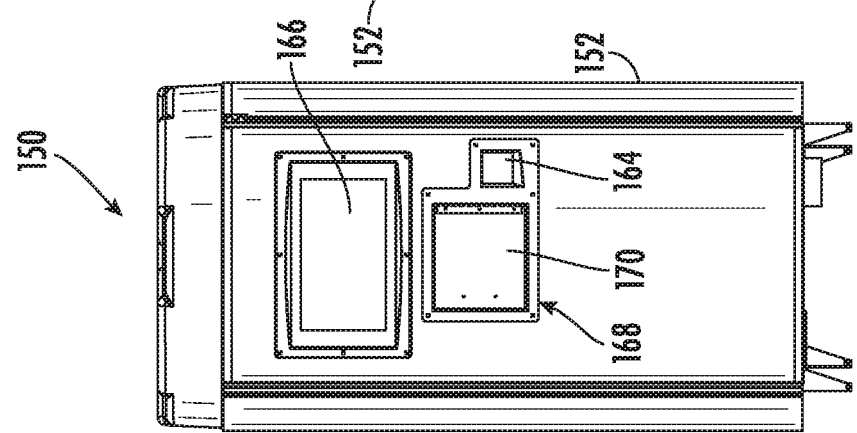
Figure 4A:
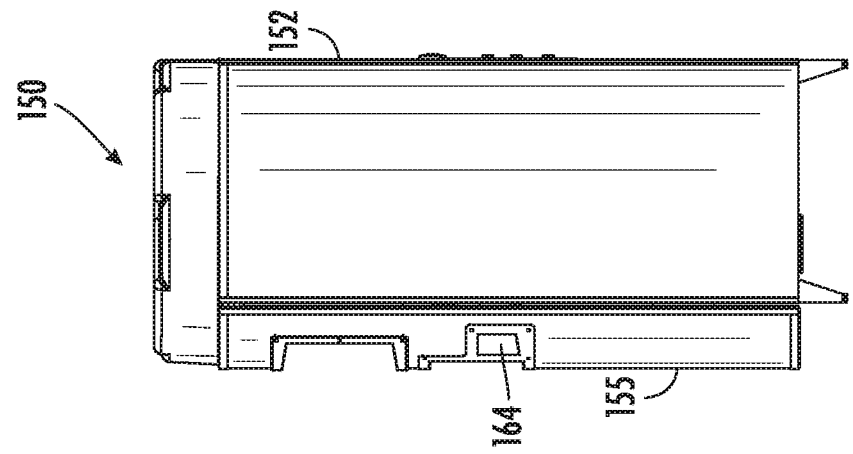

As shown most clearly with reference to FIG. 4D, water, power and communications interconnects are provided. Specifically, water interconnect 156, drain interconnect 158, power interconnect 160 and communications interconnect 162 are provided. Additionally, system 150 incorporates a payment station 164 (FIG. 4B) that is configured to accept bills, coins, credit cards, and/or other forms of payment. Depending upon the configuration, payment station 164 may use power and/or communications capabilities provided by power interconnect 160 and communications interconnect 162, respectively, in order to facilitate point-of-sale transactions associated with the dispensing of chilled water.

Dispensing of the chilled water may be performed in pre-programmed amounts or consumer-selected amounts such as via interaction with a user interface 166, which may be configured with a touchscreen for receiving user inputs, in some embodiments. The inputs may be evaluated in accordance with computer processor-executed instructions that are used to determine an amount of chilled water that is to be dispensed. The dispensed amounts may be set in common sizes, pints, quarts, and/or liters, for example. A water dispenser 168, which incorporates a movable door 170 in this embodiment for exposing a chilled water outlet, is used to dispense the chilled water.

Figure 5:
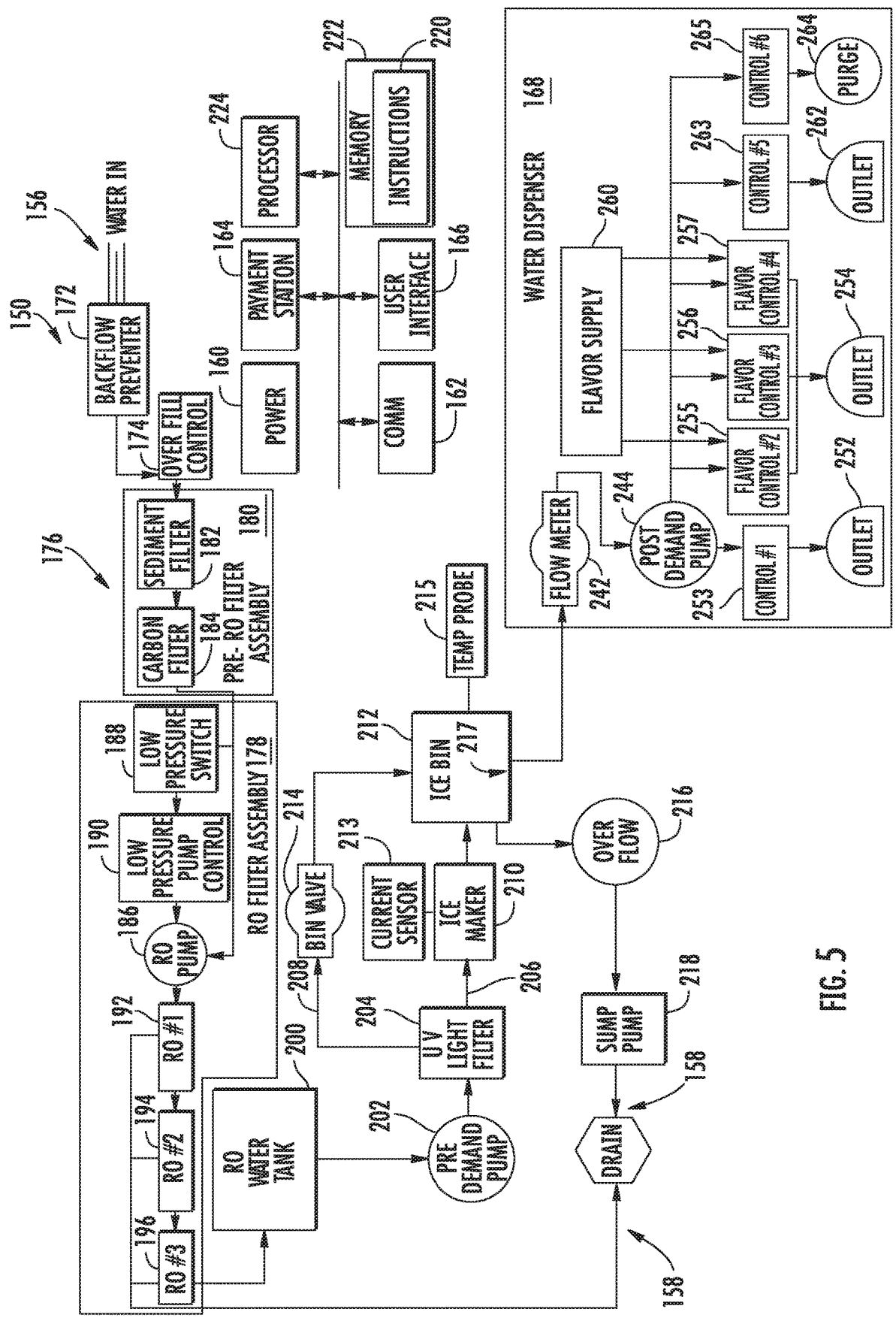
FIG. 5 is a schematic view of the embodiment of FIGS. 3A, 3B and 4A-4D.
Figure 7:
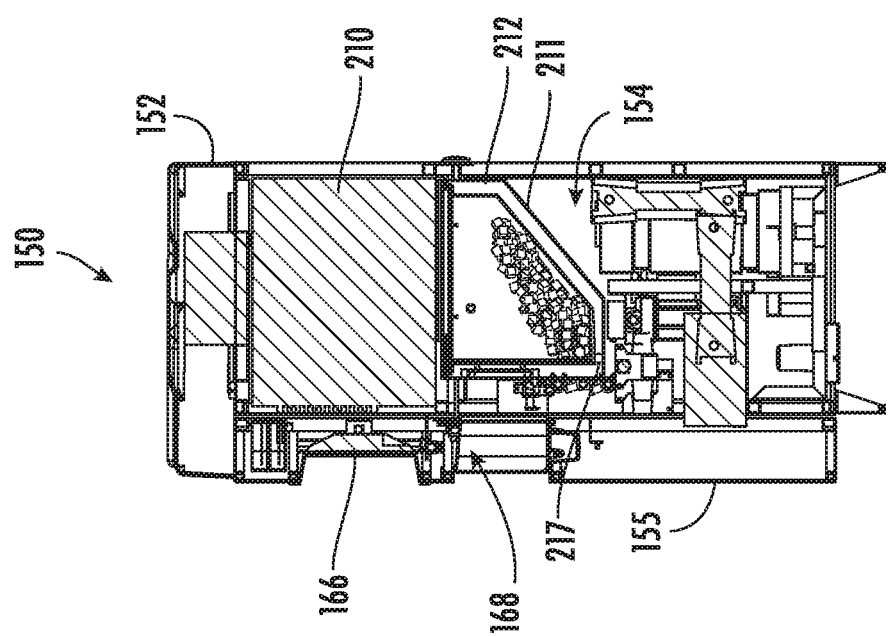
FIG. 7 is schematic view shown partially in cross-section as viewed along section line A-A of FIG. 6.
Figure 6:
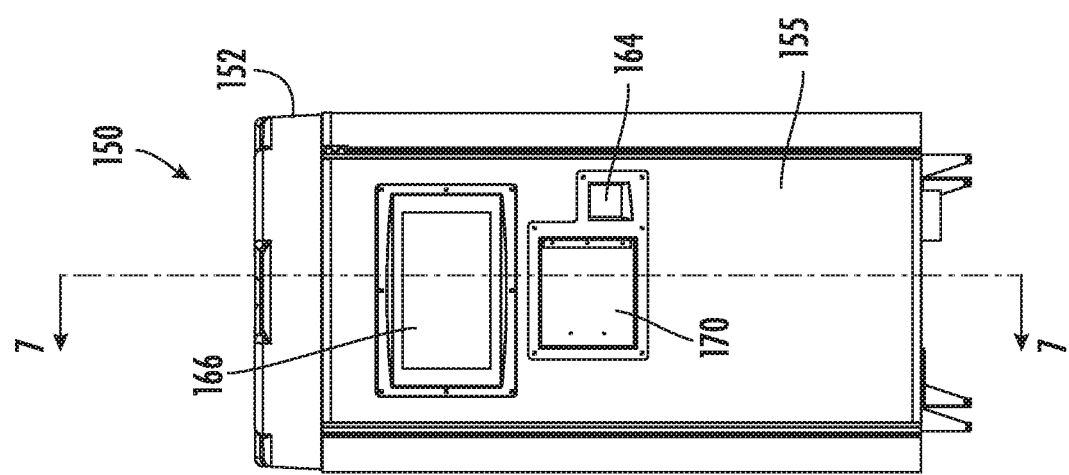
FIG. 6 is a schematic elevational view of the embodiment of FIG. 5.
Figure 9:
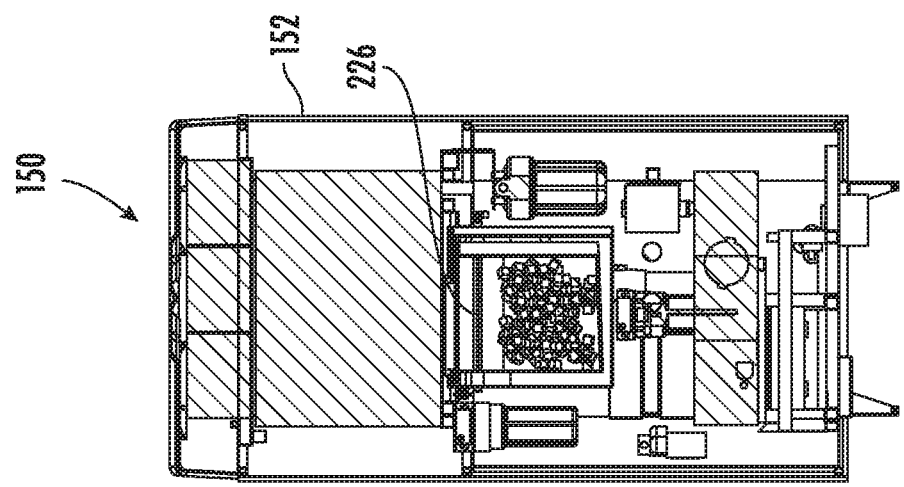
FIG. 9 is schematic view shown partially in cross-section as viewed along section line B-B of FIG. 8.
Figure 8:
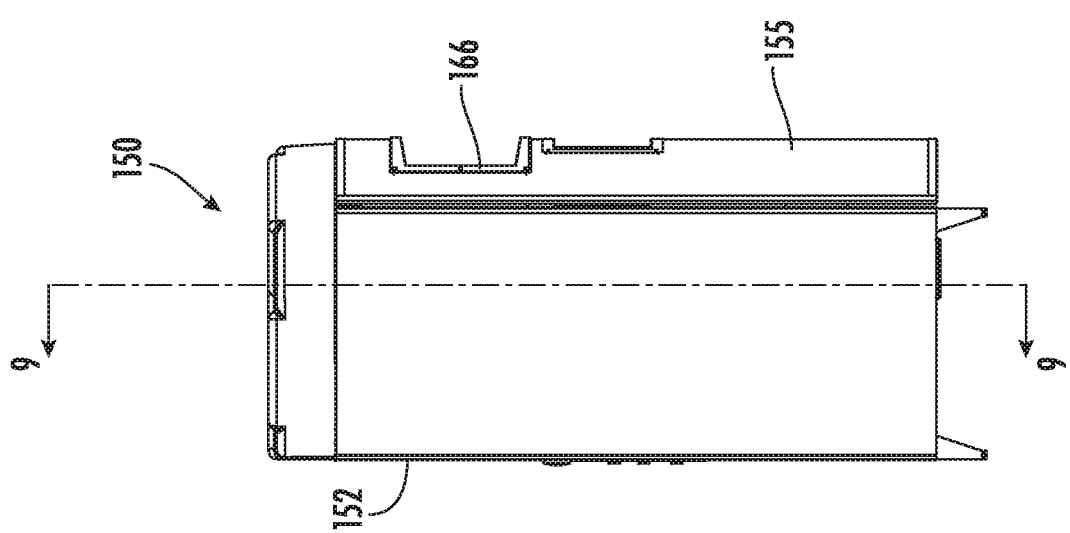
FIG. 8 is a schematic elevational view of the embodiment of FIGS. 6 and 7.
Figure 12:
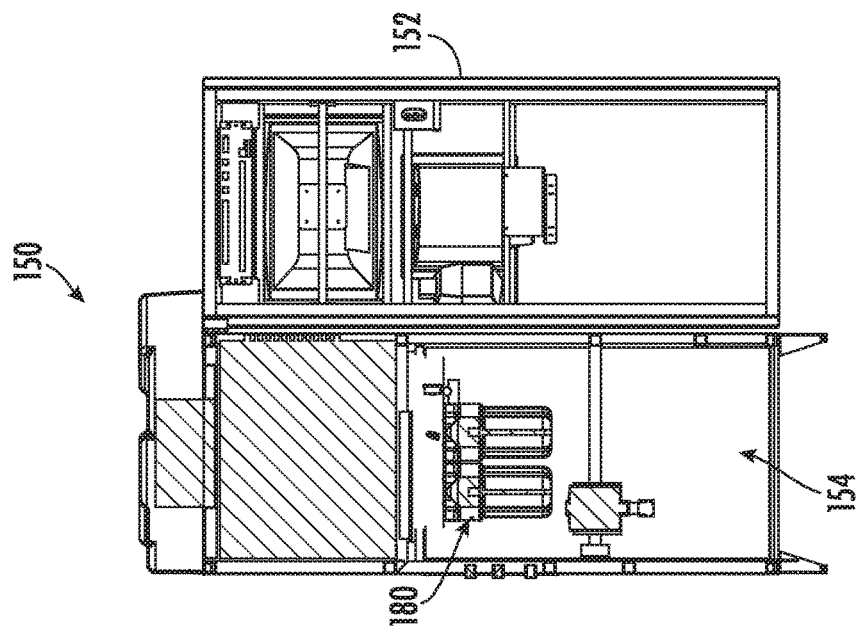
FIG. 12 is schematic view shown partially in cross-section as viewed along section line D-D of FIG. 10.
Figure 11:
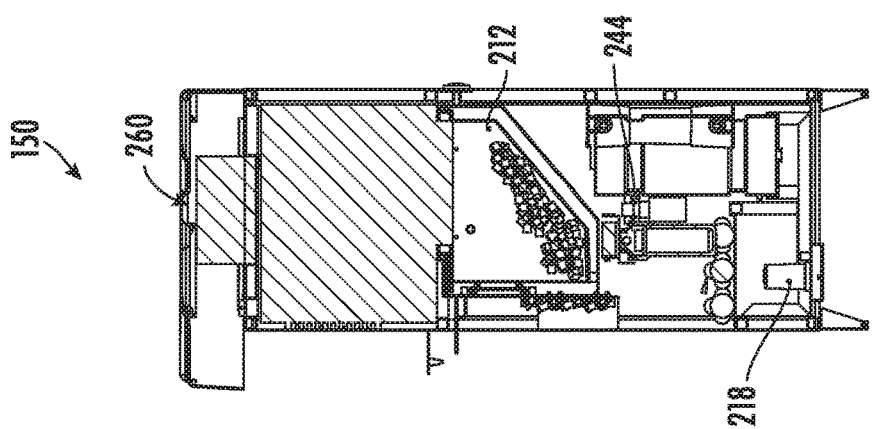
FIG. 11 is schematic view shown partially in cross-section as viewed along section line C-C of FIG. 10.
Figure 10:
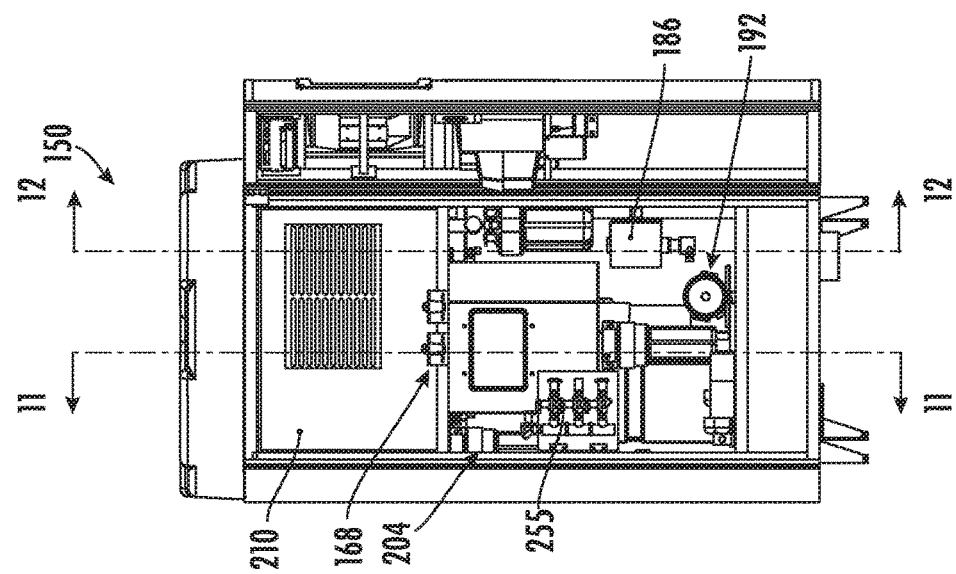
FIG. 10 is a schematic elevational view of the embodiment of FIGS. 6-9.

With reference to FIGS. 5-12, various subsystems/components of system 150 will be described in greater detail. As shown in FIG. 5, water interconnect 156 fluidly communicates with backflow preventer 172, which (in cooperation with overfill control device 174) provides a flow of water to filtration system 176. Filtration system 176 is configured to filter the flow of water and provide filtered water to a water tank 200. In particular, filtration system 176 includes a reverse osmosis (RO) filter assembly 178 and a pre-RO filter assembly 180. Pre-RO filter assembly 180 is configured to receive the flow of water, reduce particulate content from the flow of water and provide pre-RO filtered water to RO filter assembly 178.

In this embodiment, pre-RO filter assembly 180 includes a sediment filter 182 and a carbon filter 184 that are connected in series. Filters 182 and 184 filter the flow of water and provide the pre-RO filtered water to a reverse osmosis (RO) pump 186 of RO filter assembly 178. A low pressure switch 188 monitors pressure of the flow of water provided to RO pump 186 and, in response to a low pressure condition, provides a signal to low pressure pump control 190 (e.g., a solenoid) to turn off RO pump 186 in order to prevent damage to the pump.

RO pump 186 directs a flow of water to one or more RO membrane assemblies. In this embodiment, three RO membrane assemblies (192, 194 and 196) are provided that fluidly communicate in series. Each of the RO membrane assemblies may include one or more RO membranes. Notably, water provided to an RO filter may be directed to drain via drain interconnect 158 such as if an overfill condition is sensed, for example. Water not directed to drain is provided as filtered water to water tank 200.

Downstream of water tank 200, the filtered water is provided to pre-demand pump 202, after which the filtered water is exposed to ultraviolet (UV) light from a UV light filter 204. From UV light filter 204, the filtered water is routed as needed along a first flow path 206 and a second flow path 208. Specifically, filtered water routed along first flow path 206 is provided to ice maker 210 to produce ice, which is deposited into ice bin 212 for storage. In this embodiment, an optional current sensor 213 is shown that is electrically coupled to ice maker 212. Current sensor 213 is used to determine whether ice maker 212 is operational and pulling current.

Ice bin 212 incorporates an inclined sidewall 211 that is configured to direct contents of ice bin 212 towards outlet 217, which is located at a low point of the bin. In this embodiment, sidewall 211 is positioned at the rear of ice bin 212 and outlet 217 is located at the front; thus, sidewall 211 is inclined downwardly from back to front. It should also be noted that ice produced by ice maker 210 is dispensed into ice bin towards the rear of the bin and is urged forward by the slope of sidewall 211.

Filtered water routed along second flow path 208 is provided, via operation of water control (bin) valve 214, to ice bin 212 so that the filtered water is cooled by the stored ice to form chilled water. Valve 214 directs an amount of filtered water into ice bin 212 in response to a demand signal, which corresponds to an input from user interface 166. In operation, such a user input may be interpreted by computer implemented instructions (e.g., instructions 220) stored in memory 222 and executed by processor 224 to generate the demand signal.

Processor 224 may include a custom made or commercially available processor, a central processing unit (CPU) or an auxiliary processor among several processors, a microprocessor, a semiconductor-based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

Memory 224 can include any one or a combination of volatile memory elements (e.g., random-access memory (RAM, such as DRAM, and SRAM, etc.)) and nonvolatile memory elements. The memory typically comprises a native operating system, one or more native applications, emulation systems, or emulated applications for any of a variety of operating systems and/or emulated hardware platforms, emulated operating systems, etc. For example, the applications may include application specific software which may comprise components associated with user interface 166, payment station 164 and/or others. In accordance with such embodiments, the components are stored in memory and executed by processor 224.

One of ordinary skill in the art will appreciate that the memory 224 can, and typically will, comprise other components which have been omitted for purposes of brevity. Note that in the context of this disclosure, a non-transitory computer-readable medium stores one or more programs for use by or in connection with an instruction execution system, apparatus, or device.

Water provided into ice bin 212 is distributed therein by a water distribution tube 226, which spans across a top portion of the bin. Water distribution tube 226 incorporates multiple outlet ports that are configured to distribute (e.g., spray) the water across a top surface of the ice stored in ice bin 212. In some embodiments, the outlet ports may be arranged at an angle of inclination of approximately 30 degrees to cause the water to sprinkle over about 90% of the top surface of the ice stored in the ice bin. As the water sprinkles over the ice, a portion of the ice melts and cools the water as the water flows down and arrives in the vicinity of outlet 217. From there, the water is drawn through the outlet 217 by suction provided by post-demand pump 244 for dispensing as chilled water, which may be flavored or unflavored in this embodiment.

By only distributing water into the ice bin for cooling in response to consumer demand, a ready supply of ice is available for use and freshness of the chilled water is maintained. Water remaining inside ice bin 212 after consumer demand has been met and/or when the ice melts may be purged out of the bin and used to rinse or clean dispensing components of the system. Thus, the system is very efficient and is able to maintain a full level of ice, which enables the system to deliver what may seem like an endless supply of chilled water.

Also shown is a temperature probe 215 that is configured to monitor the temperature of the chilled water that is being dispensed. Information from temperature probe 215 may also be used to determine whether ice maker 210 is operational since the water temperature tends to increase as the amount of ice in ice bin 212 decreases. By way of example, if a threshold temperature of 35 degrees (F) is set, in response to temperature probe 215 sensing a temperature above 35 degrees, an alarm indication may be actuated and/or the system may be disabled from dispensing water until the desired temperature is achieved.

An overflow 216 is provided at a lower portion of ice bin 212 to facilitate removal of excess chilled water. In some embodiments, this is accomplished with the assistance of a sump pump 218 that urges excess to drain 158.

Water dispenser 168 fluidly communicates with ice bin 212 to receive chilled water. Water dispenser 168 incorporates a flow meter 242 and a downstream post-demand pump 244. Post-demand pump 244 operates by monitoring a rate of flow of chilled water via flow meter 242 and provides a requested amount of chilled water to be available at an appropriate chilled water outlet. In this embodiment, multiple chilled water outlets are provided, with each being configured to perform a different function. By way of example, outlet 252, in cooperation with control valve 253 (e.g., a solenoid), is configured to dispense unflavored, chilled water to a consumer in amounts less than one gallon; whereas outlet 262, in cooperation with control valve 263, is configured to dispense unflavored, chilled water to a consumer in amounts greater than one gallon. Additionally, outlet 254, in cooperation with control valves 255, 256 and 257, is configured to dispense flavored, chilled water to a consumer. Specifically, each of the control valves 255, 256 and 257 is configured to provide a predetermined amount of a corresponding flavoring agent (which is provided by flavor supply 260) based on user demand. Note that, in this embodiment, outlet 254 handles all of the dispensed chilled water that receives flavoring agent so that chilled water dispensed from outlet 252 remains free of any flavoring agent.

Purge valve 264 is configured to periodically purge (e.g., by means of a settable timer) water out of ice bin 212 to ensure that dispensed chilled water is fresh. This process, which functions in cooperation with post-demand pump 244, also keeps water lines of water dispenser 168 full of chilled water. Additionally, this process provides a rinsing function that prevents contamination of water-only components with flavor, as the purge operation flushes the water lines.

Thus, while particular embodiments have been shown and described in detail herein, various modifications may be made without departing from the scope of the present Invention or the appended claims.

What is claimed is:

1. A system for producing and dispensing chilled water comprising:
   an exterior housing defining an interior compartment;
     a water tank disposed within the interior compartment;
     a filtration system, disposed within the interior compartment, configured to receive a flow of water from outside the exterior housing, filter the flow of water and provide filtered water to the water tank;
     an ice maker, disposed within the interior compartment and along a first flow path from the water tank, configured to produce ice from the filtered water provided from the first flow path;
     an ice bin, disposed within the interior compartment, configured to receive the ice from the ice maker;
     a user interface configured to receive a user input corresponding to a request for chilled water;
     a water control valve, disposed within the interior compartment and along a second flow path from the water tank, configured to receive the filtered water provided from the second flow path and provide a controlled flow of the filtered water to the ice bin in response to the user input;
     a water distribution outlet configured to distribute the controlled flow of the filtered water across a top surface of the ice stored in the ice bin, wherein the controlled flow of the filtered water from the water distribution outlet directly contacts and is cooled by the ice in the ice bin to form chilled water; and
     a water dispenser fluidly communicating with the ice bin and configured to provide the chilled water outside of the exterior housing according to the user input.

2. The system of claim 1, wherein:
   the filtration system has a reverse osmosis (RO) filter assembly and a pre-RO filter assembly;
   the pre-RO filter assembly is configured to receive the flow of water, reduce particulate content from the flow of water and provide pre-RO filtered water to the RO filter assembly;
   the RO filter assembly has an RO pump and a first RO membrane assembly; and
   the RO pump is configured to receive the pre-RO filtered water and direct the pre-RO filtered water to the first RO membrane assembly, which filters the pre-RO filtered water and provides the filtered water to the water tank.

3. The system of claim 2, wherein the RO filter assembly has a second RO membrane assembly fluidly communicating in series with the first RO membrane assembly.

4. The system of claim 2, wherein the pre-RO filter assembly has a sediment filter.

5. The system of claim 4, wherein the pre-RO filter assembly further has a carbon filter fluidly communicating in series with the sediment filter.

6. The system of claim 1, further comprising an ultraviolet (UV) filter, disposed along the first flow path and the second flow path, configured to further filter the filtered water provided from the water tank.

7. The system of claim 1, further comprising a pre-demand pump, disposed along the first flow path and the second flow path, configured to provide a pressurized flow of the filtered water from the water tank.

8. The system of claim 1, further comprising a flavor delivery assembly configured to selectively provide a flavoring agent to the chilled water.

9. The system of claim 1, wherein the water dispenser has a first chilled water outlet configured to dispense the chilled water and a second chilled water outlet configured to receive the flavoring agent from the flavor delivery assembly and dispense the chilled water with the flavoring agent.

10. The system of claim 1, wherein:
    the system further comprises a water distribution tube spanning across a top portion of the ice bin; and
    the water distribution outlet is formed in the water distribution tube.

11. The system of claim 1, wherein the water distribution outlet is configured to spray the controlled flow of the filtered water across a top surface of the ice stored in the ice bin.

* * * * *